United States Patent [19]
Sakai et al.

[11] Patent Number: 5,565,001
[45] Date of Patent: Oct. 15, 1996

[54] HYDRAULIC BYPASS TO BACK PRESSURE CHAMBER OF A CLUTCH ACCUMULATOR

[75] Inventors: Takafumi Sakai; Hideki Wakamatsu; Kenichi Haraguchi; Masaaki Takamatsu, all of Wako, Japan

[73] Assignee: Honda Giken Kabushiki Kaisha, Tokyo, Japan

[21] Appl. No.: 285,105

[22] Filed: Aug. 3, 1994

[30] Foreign Application Priority Data

Sep. 1, 1993 [JP] Japan ................................ 5-217500

[51] Int. Cl.$^6$ ............................. F16H 59/08; F16H 61/08
[52] U.S. Cl. ............................................. 477/143; 477/150
[58] Field of Search ......................... 475/128, 129; 477/143, 150, 151, 152

[56] References Cited

U.S. PATENT DOCUMENTS

| | | | |
|---|---|---|---|
| 4,709,597 | 12/1987 | Yasue et al. | 475/129 X |
| 4,791,568 | 12/1988 | Hiramatsu et al. | 477/143 X |
| 5,010,787 | 4/1991 | Takada et al. | 477/143 X |
| 5,136,898 | 8/1992 | Hirose | 477/150 |
| 5,366,420 | 11/1994 | Kuriyama et al. | 475/129 |
| 5,397,284 | 3/1995 | Matsumoto et al. | 475/129 X |
| 5,431,608 | 7/1995 | Hirose | 475/129 X |

FOREIGN PATENT DOCUMENTS 5-6058  1/1993  Japan.

*Primary Examiner*—Khoi Q. Ta
*Attorney, Agent, or Firm*—Armstrong, Westerman, Hattori, McLeland & Naughton

[57] ABSTRACT

A control apparatus for a hydraulically operated vehicular transmission having a plurality of hydraulic engaging elements has an accumulator which is connected in parallel with a hydraulic engaging element for a low-speed transmission train and a back pressure generating source which generates a hydraulic oil pressure to be supplied to a back pressure chamber of the accumulator. The control apparatus includes a changeover valve which can be changed over between a first position in which the back pressure chamber of the accumulator and the back pressure generating source are brought into communication with each other and a second position in which the communication is cut off to lower a pressure in the back pressure chamber. The changeover valve is arranged to be changed over from the second position to the first position when a hydraulic oil pressure in the hydraulic engaging element for the low-speed transmission train has exceeded a predetermined pressure.

6 Claims, 3 Drawing Sheets

HYDRAULIC BYPASS TO BACK PRESSURE CHAMBER OF A CLUTCH ACCUMULATOR

BACKGROUND OF THE INVENTION

1. Field of the Invention

The present invention relates to a control apparatus for a hydraulically operated vehicular transmission which has a plurality of hydraulic engaging elements.

2. Description of Related Art

As this kind of transmission, there has hitherto been known one in which a hydraulic engaging element for a high-speed transmission train is commonly used as a hydraulic engaging element for a reverse transmission train so that the high-speed transmission train and the reverse transmission train can be selectively established by means of a selector gear. As a control apparatus for this kind of transmission, there is known one, as is disclosed in Japanese Published Examined patent application No. 6058/1993, which comprises a servo valve for changing over between forward running and reverse running which is operated to change over the selector gear, and a servo control valve which moves in response to a pressure of the hydraulic oil in a hydraulic engaging element for a low-speed transmission train which is supplied at the beginning of changing over to the forward running range. When the hydraulic oil pressure in the hydraulic engaging element for the low-speed transmission train has increased to a predetermined pressure, the hydraulic oil pressure is supplied to the servo valve via the servo control valve so as to change over the servo valve to a forward running position.

Further, in this control apparatus, in order to alleviate or decrease speed change shocks by buffering a sudden pressure change at the time of supply and discharge of the hydraulic oil to and from respective hydraulic engaging elements, an accumulator is parallelly connected to each of the hydraulic engaging elements. The hydraulic oil pressure corresponding to an engine load such as a throttle opening degree or the like is thus caused to be applied to a back pressure chamber of each of the accumulators.

At an in-gear time (i.e., at the time of gear engagement) to start by changing over from a neutral range to a forward-running range, if the hydraulic engaging element for the low-speed transmission train is suddenly engaged, the driving torque suddenly rises and, by its reaction force, a driving unit made up of an engine and a transmission suddenly displaces in posture through an elastic deformation of engine mounting elements, thereby giving rise to in-gear shocks (i.e., shocks at the time of gear engagement). In this case, the in-gear shocks cannot sufficiently be alleviated or decreased even if the back pressure in the accumulator is controlled depending on the engine load.

In view of the above-described points, the present invention has an object of providing a control apparatus for a hydraulically operated vehicular transmission in which the in-gear shocks can be alleviated by adequately controlling the back pressure in the accumulator.

SUMMARY OF THE INVENTION

In order to attain the above and other objects, the present invention is a control apparatus for a hydraulically operated vehicular transmission having a plurality of hydraulic engaging elements, the apparatus having an accumulator which is connected in parallel with a hydraulic engaging element for a low-speed transmission train and a back pressure generating source which generates a hydraulic oil pressure to be supplied to a back pressure chamber of the accumulator. The apparatus comprises a changeover valve which can be changed over between a first position in which the back pressure chamber of the accumulator and the back pressure generating source are brought into communication with each other and a second position in which the communication is cut off to lower a pressure in the back pressure chamber. The changeover valve is arranged to be changed over from the second position to the first position when a hydraulic oil pressure in the hydraulic engaging element for the low-speed transmission train has exceeded a predetermined pressure.

At the beginning of the in-gear time, the changeover valve is held in the second position and therefore the back pressure of the accumulator becomes low. The boosting in the pressure in the hydraulic engaging element for the low-speed transmission train is buffered in a low-pressure region and the hydraulic engaging element for the low-speed transmission train begins to be gradually engaged at the low pressure, with the result that the driving torque slowly rises to thereby alleviate the in-gear shocks. By the way, in order to alleviate the in-gear shocks, it is preferable to open the back pressure chamber to atmosphere to lower the back pressure to a minimum.

Further, in a condition in which the back pressure of the accumulator is kept low, the engagement of the hydraulic engaging element for the low-speed transmission train is delayed, resulting in a poor start response characteristics. However, according to the present invention, when the hydraulic oil pressure in the hydraulic engaging element for the low-speed transmission train has increased to a predetermined pressure, the changeover valve is changed over to the first position so that the hydraulic oil pressure of the back pressure generating source can be supplied to the back pressure chamber of the accumulator. Therefore, the hydraulic oil pressure in the hydraulic engaging element for the low-speed transmission train thereafter rises and, consequently, the hydraulic engaging element can rapidly be brought into complete engagement. Therefore, there will be no such disadvantage as the poor start response characteristics.

By the way, in case a servo valve for changing over between forward running and reverse running is provided as in the above-described prior art, there may be provided an oil passage to which a hydraulic oil pressure is supplied via the changeover valve at the second position thereof such that the servo valve can be changed over to a forward-running position by the hydraulic oil pressure in the oil passage. In this arrangement, the changeover valve can be used also as the servo control valve in the prior art, thereby simplifying the construction of the apparatus. Further, if the hydraulic oil pressure of the back pressure generating source is used as the hydraulic oil pressure in the above-described oil passage, the arrangement of the oil passage is also advantageously simplified.

In addition, as the back pressure generating source, there can be used a regulator valve for generating a constant line pressure or one which generates a hydraulic oil pressure corresponding to the engine load.

BRIEF DESCRIPTION OF THE DRAWINGS

The above and other objects and the attendant advantages of the present invention will become readily apparent by reference to the following detailed description when con

DETAILED DESCRIPTION OF A PREFERRED EMBODIMENT

Figure 1:
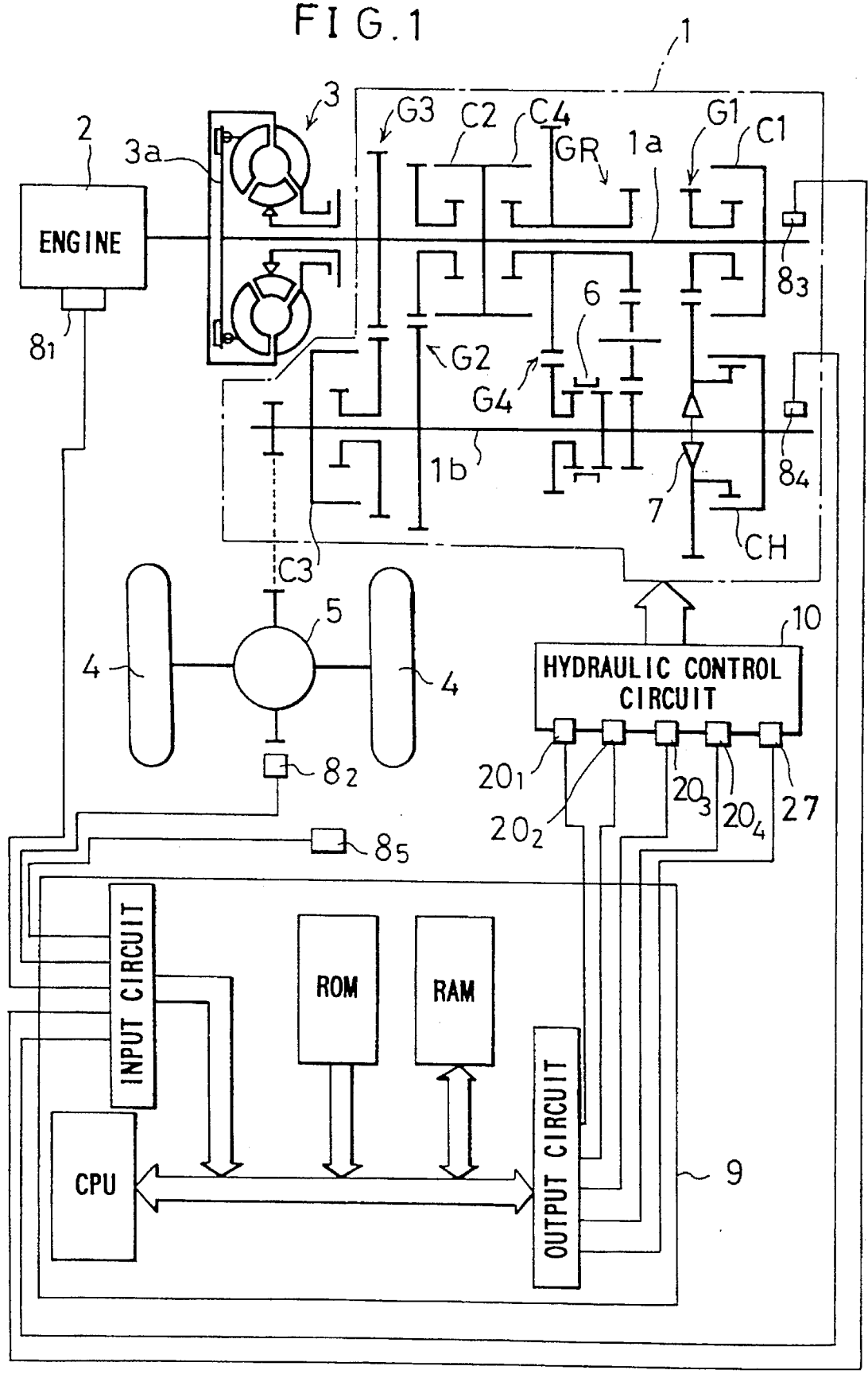
- FIG. 1 is a system diagram showing a transmission in which the present invention is applied and the control system thereof.

Referring to FIG. 1, numeral 1 denotes a transmission for effecting speed changing or shifting of four forward transmission trains and one reverse transmission train. Between an input shaft 1a which is connected to an engine 2 via a fluid torque converter 3 having a clutch 3a and an output shaft 1b which is connected via a differential gear 5 to driven wheels 4 of a vehicle, there are parallelly provided first-speed through fourth-speed forward transmission trains G1, G2, G3, G4 and one reverse transmission train GR. In the forward transmission trains there are interposed hydraulic engaging elements in the form of hydraulic clutches C1, C2, C3, C4, respectively, to selectively establish each of the forward transmission trains through engagement of each of the hydraulic clutches. The reverse transmission train GR is arranged to share the use of the fourth-speed hydraulic clutch C4 with the fourth-speed transmission train G4. The fourth-speed transmission train G4 and the reverse transmission train GR are thus selectively established by the changing over of a selector gear 6 which is provided on the output shaft 1b to the forward running position on the left-hand side in the drawing and to the reverse running position on the right-hand side therein.

In the first-speed transmission train G1 there is interposed a one-way clutch 7 which allows for overrunning of the output side. It is thus so arranged that, even in a condition in which the first-speed hydraulic clutch C1 is kept engaged, each of the transmission trains G2, G3, G4 of the second speed through the fourth speed can be established by engaging the second-speed through the fourth-speed hydraulic clutches C2, C3, C4. Further, there is provided a first-speed holding clutch CH which bypasses the one-way clutch 7. It is thus so arranged that the first-speed transmission train G1 can be established in a condition in which, by the engagement of the hydraulic clutch CH, the overrunning of the output side is not allowed, i.e., a condition in which the engine braking can be applied.

There are provided an electronic control circuit 9 and a hydraulic control circuit 10 for the above-described plurality of hydraulic clutches. The electronic control circuit 9 is made up of a microcomputer to which there are inputted signals from an engine sensor $8_1$ for detecting a throttle opening, a revolution speed, a cooling water temperature or the like of the engine 2, a vehicle speed sensor $8_2$ for detecting the speed of the vehicle based on the revolution speed of the differential gear 5, rotation sensors $8_3$, $8_4$ for detecting the revolution speeds of the input shaft 1a and the output shaft 1b, respectively, of the transmission 1, and a position sensor $8_5$ for the manual valve which is to be described hereinafter. Speed changing is thus made by controlling a plurality of solenoid valves, which are described hereinafter, of the hydraulic control circuit 10 by the electronic control circuit 9.

Figure 2:
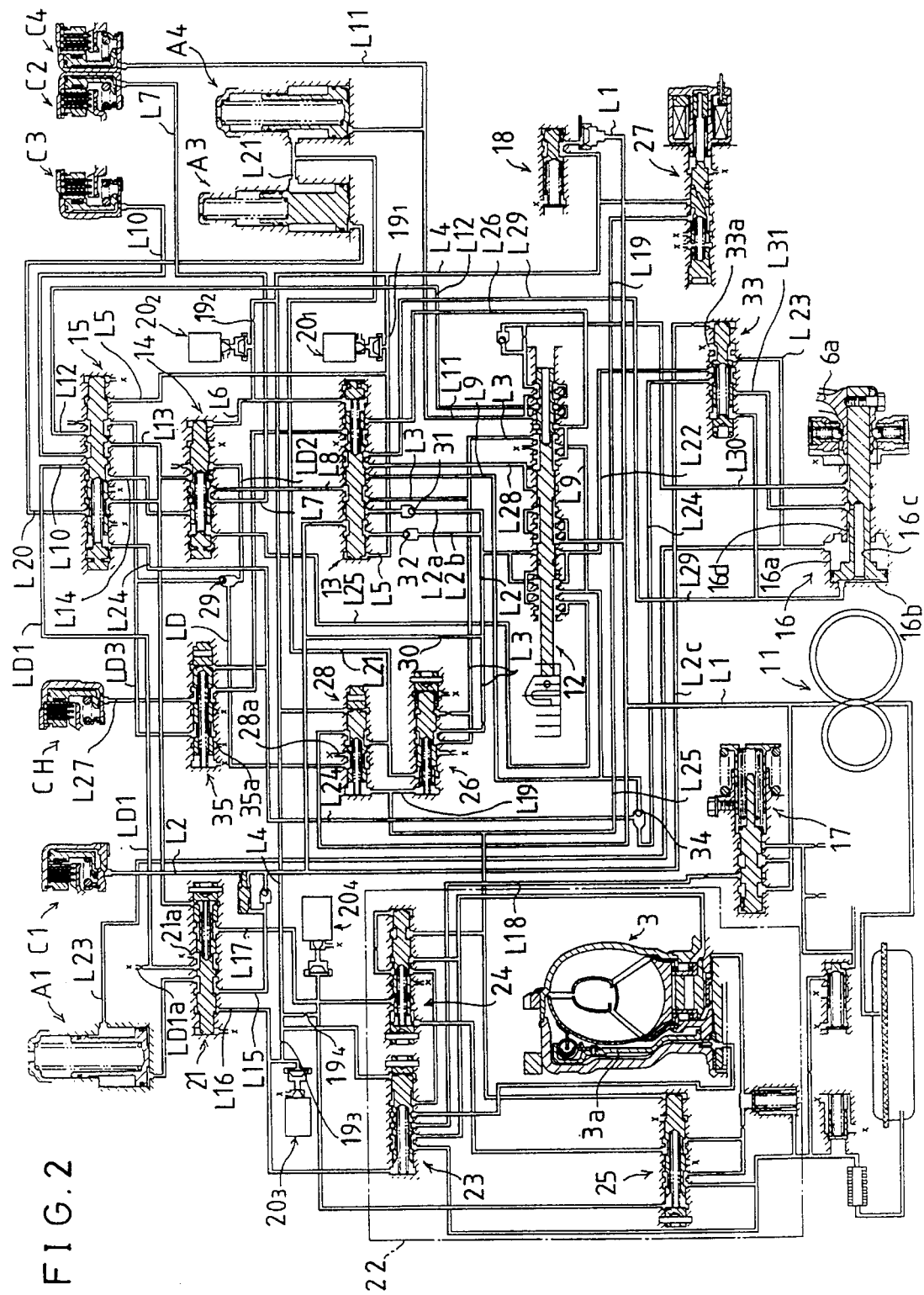
FIG. 2 is a circuit diagram showing a hydraulic control circuit thereof.
Figure 3:
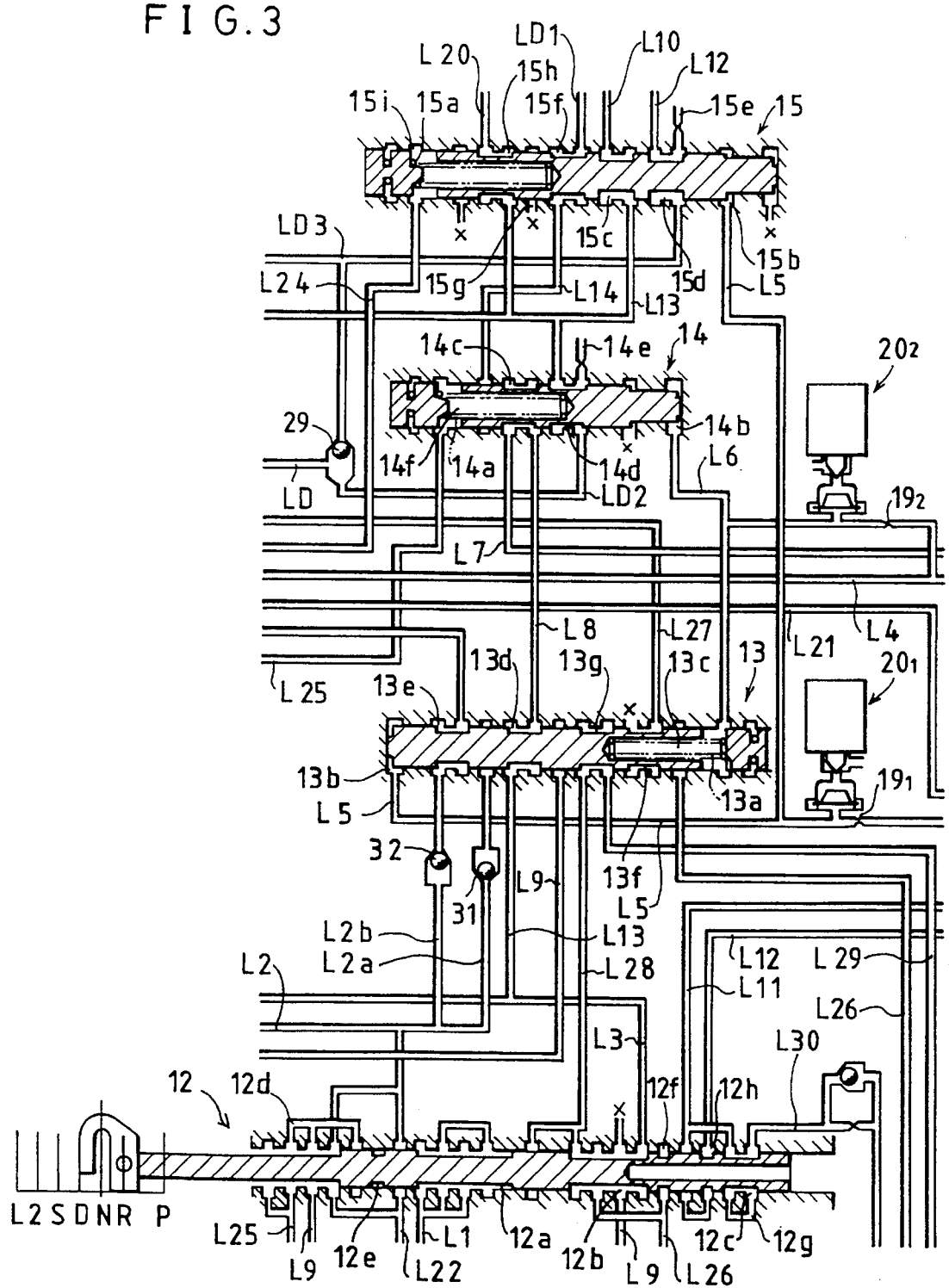
FIG. 3 is an enlarged view of a manual valve and shift valves in the circuit of FIG. 2.

The hydraulic control circuit 10 is provided, as shown in FIGS. 2 and 3, with a hydraulic oil pressure source 11, a manual valve 12 which can be changed over to seven positions of "P" for parking, "R" for reverse running, "N" for neutral, "D" and "S" for automatic speed changing, "2" for holding the second speed and "L" for holding the first speed, three sets of No. 1 through No. 3 shift valves 13, 14, 15, and a servo valve 16 to which is connected a shift fork 6a of the selector gear 6 for changing over between the forward running and the reverse running.

In the "D" position of the manual valve 12, No. 1 oil passage L1 which is communicated with the hydraulic oil pressure source 11 is connected, via an annular groove 12a of the manual valve 12, to No. 2 oil passage L2 which is communicated with the first-speed hydraulic clutch C1. Pressurized hydraulic oil which is adjusted by a regulator valve 17 to a constant line pressure is always supplied from No. 1 oil passage L1 to the first-speed hydraulic clutch C1 via No. 2 oil passage L2. Further, the hydraulic oil is selectively supplied to the second-speed through the fourth-speed hydraulic clutches C2, C3, C4 via No. 3 oil passage L3 which is branched from No. 2 oil passage L2 and via the above-described shift valves 13, 14, 15.

Here, No. 1 shift valve 13 is urged to the left-hand side by a spring 13a and No. 2 shift valve 14 and No. 3 shift valve 15 are urged to the right-hand side by a spring 14a, 15a, respectively. A modulator pressure (a constant pressure which is lower than the line pressure) from a modulator valve 18 which is connected to No. 1 oil passage L1 is inputted, via No. 5 oil passage L5 that is communicated via an orifice $19_1$ with No. 4 oil passage L4 on the output side of the modulator valve 18, to a left end oil chamber 13b of No. 1 shift valve 13 and to a right-hand side oil chamber 15b of No. 3 shift valve 15, respectively. The modulator pressure is also inputted, via No. 6 oil passage L6 which is communicated via an orifice $19_2$ with No. 4 oil passage L4, to a right end oil chamber 13c of No. 1 shift valve 13 and to a right end oil chamber 14b of No. 4 shift valve 14, respectively. There are further provided in No. 5 oil passage L5 a normally-closed type No. 1 solenoid valve $20_1$ which opens No. 5 oil passage L5 to atmosphere and in No. 6 oil passage L6 a normally-closed type No. 2 solenoid valve $20_2$ which opens No. 6 oil passage L6 to atmosphere. By the opening and closing of these two solenoid valves $20_1$, $20_2$, these shift valves 13, 14, 15 are changed over in the following manner in accordance with each of the transmission trains.

Namely, at the first speed, No. 1 solenoid valve $20_1$ is closed and No. 2 solenoid valve $20_2$ is opened. According to this operation, the modulator pressure is inputted to the left end oil chamber 13b of No. 1 shift valve 13 and to the right-hand side oil chamber 15b of No. 3 shift valve 15 respectively, and the right end oil chamber 13c of No. 1 shift valve 13 and the right end oil chamber 14b of No. 2 shift valve 14 are opened to atmosphere. No. 1 shift valve 13 and No. 2 shift valve 14 are thus changed over to right-hand side position and No. 3 shift valve 15 is changed over to the left-hand side position. In this condition, No. 7 oil passage L7 which is communicated with No. 2 hydraulic clutch C2 is connected, via an annular groove 14c of No. 2 shift valve 14, to No. 8 oil passage L8 which leads to No. 1 shift valve 13, and No. 8 oil passage L8 is connected, via an annular groove 13d of No. 1 shift valve 13, to No. 9 oil passage L9 that is connected to an open-to-atmosphere groove 12b of the manual valve 12 in the "D" position thereof, thereby discharging the hydraulic oil from the second-speed hydraulic clutch C2. In addition, No. 10 oil passage L10 which is communicated with the third-speed hydraulic clutch C3 is connected, via an annular groove 15c of No. 3 shift valve 15, to No. 1 oil discharge passage LD1, thereby discharging the hydraulic oil from the third-speed hydraulic clutch C3. Further, No. 12 oil passage L12 which is connected, via an annular groove 12c of the manual valve 12 in its "D" position, to No. 11 oil passage L11 to be connected to the fourth-speed hydraulic clutch C4, is connected to No. 13 oil passage L13 via an annular groove 15d of No. 3 shift valve 15. No. 13 oil passage L13 is connected, via an annular groove 14d of No. 2 shift valve 14, to an oil discharge port 14e of No. 2 shift valve 14 as well as to No. 2 oil discharge passage LD2, whereby the hydraulic oil is discharged from the fourth-speed hydraulic clutch C4. In this manner, it becomes only the first-speed clutch C1 that is supplied with the hydraulic oil, thereby establishing the first-speed transmission train G1.

At the second speed, both No. 1 solenoid valve $20_1$ and No. 2 solenoid valve $20_2$ are opened. According to this operation, No. 1 shift valve 13 is changed over to the left-hand side position and No. 2 shift valve 14 and No. 3 shift valve 15 are changed over to the right-hand side position. In this condition, No. 3 oil passage L3 is connected to No. 8 oil passage L8 via the annular groove 13d of No. 1 shift valve 13, and No. 8 oil passage L8 is connected to No. 7 oil passage L7 via the annular groove 14c of No. 2 shift valve 14, thereby supplying the hydraulic oil to the second-speed hydraulic clutch C2. On the other hand, No. 10 oil passage L10 which is communicated with the third-speed hydraulic clutch C3 is connected to the oil discharge port 14e and to No. 2 oil discharge passage LD2 via the route of the annular groove 15c of No. 3 shift valve 15, No. 13 oil passage L13 and the annular groove 14d of No. 2 shift valve 14, thereby discharging the hydraulic oil from the third-speed hydraulic clutch C3. Further, No. 11 oil passage L11 which is communicated with the fourth-speed hydraulic clutch C4 is connected, via No. 12 oil passage L12, and the annular groove 15d of No. 3 shift valve 15, to an oil discharge port 15e of No. 3 shift valve 15 as well as to No. 3 oil discharge passage LD3, thereby discharging the hydraulic oil from the fourth-speed hydraulic clutch C4. The second-speed transmission train G2 is therefore established.

At the third speed, No. 1 solenoid valve $20_1$ is opened and No. 2 solenoid valve $20_2$ is closed. According to this operation, No. 1 shift valve 13 is kept in the left-hand side position, No. 3 shift valve 15 is kept in the right-hand side position and No. 2 shift valve 14 is changed over to the left-hand side position by the input of the modulator pressure to the right end oil chamber 14b of No. 2 shift valve 14. In this condition, like at the second speed, No. 8 oil passage L8 which is connected to No. 3 oil passage L3 via the annular groove 13d of No. 1 shift valve 13 is connected to No. 13 oil passage L13 via the annular groove 14d of No. 2 shift valve 14. Here, like at the second speed, since No. 13 oil passage L13 is connected to No. 10 oil passage L10 via the annular groove 15c of No. 3 shift valve 15, the hydraulic oil is supplied to the third-speed hydraulic clutch C3. On the other hand, No. 7 oil passage L7 which is communicated with the second-speed hydraulic clutch C2 is connected to No. 1 oil discharge passage LD1 via the route of the annular groove 14c of No. 2 shift valve 14, No. 14 oil passage L14 and an annular groove 15f of No. 3 shift valve 15, thereby discharging the hydraulic oil from the second-speed hydraulic clutch C2. Further, No. 11 oil passage L11 which is communicated with the fourth-speed hydraulic clutch C4 is connected, via the same route as at the second speed, to the oil discharge port 15e of No. 3 shift valve 15 as well as to No. 3 oil discharge passage LD3, thereby discharging the hydraulic oil from the fourth-speed hydraulic clutch C4. The third-speed transmission train G3 is therefore established.

At the fourth speed, No. 1 solenoid valve $20_1$ and No. 2 solenoid valve $20_2$ are both closed. According to this operation, the modulator pressure is inputted to the left end oil chamber 13b of No. 1 shift valve 13, but this rightward urging force is balanced with the modulator pressure to be inputted to the right end oil chamber 13c of No. 1 shift valve 13, with the result that No. 1 shift valve 13 is held in the left-hand side position of No. 1 shift valve 13 due to the force of the spring 13a. No. 2 shift valve 14 is also held in the left-hand side position like at the third speed but, on the other hand, No. 3 shift valve 15 is changed over to the left-hand side position by the input of the modulator pressure to the right-hand side oil chamber 15b of No. 3 shift valve 15. In this condition, No. 13 oil passage L13 which is communicated with No. 3 oil passage L3 via No. 8 oil passage L8 is connected to No. 12 oil passage L12 via the annular groove 15d of No. 3 shift valve 15, thereby supplying the hydraulic oil to the fourth-speed hydraulic clutch C4. On the other hand, No. 10 oil passage L10 which is communicated with the third-speed hydraulic clutch C3 is connected to No. 1 oil discharge passage LD1 via the annular groove 15c of No. 3 shift valve 15, thereby discharging the hydraulic oil from the third-speed hydraulic clutch C3. Furthermore, No. 14 oil passage L14 which is connected, like at the third speed, via the annular oil groove 14c of No. 2 shift valve 14, to No. 7 oil passage L7 which is communicated with the second-speed hydraulic clutch C2 is connected to an oil discharge port 15g of No. 3 shift valve 15 via the annular groove 15f thereof, thereby discharging the hydraulic oil from the second-speed hydraulic clutch C2. The fourth-speed transmission train G4 is therefore established.

The opening and closing of No. 1 solenoid valve $20_1$ and No. 2 solenoid valve $20_2$ and the changeover positions of No. 1 through No. 3 shift valves 13, 14, 15 can be summarized as shown in Table 1. In the "D" position of the manual valve 12, No. 1 solenoid valve $20_1$ and No. 2 solenoid valve $20_2$ are controlled for opening or closing by the electronic control circuit 9 according to the speed-change characteristics to be set based on the speed of the vehicle and throttle opening, thereby effecting the automatic speed changing of the first speed through the fourth speed.

TABLE 1

|  | No. 1 solenoid valve | No. 2 solenoid valve | No. 1 shift valve | No. 2 shift valve | No. 3 shift valve |
| --- | --- | --- | --- | --- | --- |
| First speed | closed | open | right | right | left |
| Second speed | open | open | left | right | right |
| Third speed | open | closed | left | left | right |
| Fourth speed | closed | closed | left | left | left |

By the way, to No. 2 oil passage L2 which is communicated with the first-speed hydraulic clutch C1, there is connected an accumulator A1 for the first speed via No. 15 oil passage L15 which is branched from No. 2 oil passage L2. In this No. 15 oil passage L15 there is disposed a control valve 21 which can be changed over between the left-hand side position in which the upstream portion and the downstream portion of No. 15 oil passage L15 are brought into communication with each other and the right-hand side position in which the above-described communication is cut off. There is provided in this control valve 21 a port that is communicated with the above-described No. 1 oil discharge passage LD1. In the right-hand side position of the control valve 21, the downstream portion of No. 15 oil passage L15 that is communicated with the accumulator A1 is connected to No. 1 oil discharge passage LD1. In the left-hand side position of the control valve 21, No. 1 oil discharge passage LD1 is connected to an oil discharge port 21a of the control valve 21.

The control valve 21 is arranged to be urged to the right by the modulator pressure to be inputted through No. 16 oil passage L16 which is communicated via an orifice $19_3$ with No. 4 oil passage L4 on the output side of the modulator valve 18, and to be urged to the left by the modulator pressure to be inputted through No. 17 oil passage L17 which is communicated via an orifice $19_4$ to No. 4 oil passage L4. In No. 16 oil passage L16 and No. 17 oil passage L17 there are respectively disposed normally-closed type No. 3 solenoid valve $20_3$ and No. 4 solenoid valve $20_4$ which open the respective oil passages to atmosphere. The control valve 21 is thus arranged to be controllable by the solenoid valves $20_3$, $20_4$. The control valve 21 is also arranged to be urged to the left by the hydraulic oil pressure in No. 13 oil passage L13 which serves as an oil supply passage to the third-speed hydraulic clutch C3 and the fourth-speed hydraulic clutch C4. No. 3 solenoid valve $20_3$ is also used as a solenoid valve to change over a shift valve 23 provided in a conventional lockup control circuit 22 which controls a clutch 3a for the fluid torque converter 3 by using the hydraulic oil to be supplied from the regulator valve 17 via No. 18 oil passage L18 as a working oil. Further, No. 4 solenoid valve $20_4$ is also used as a solenoid valve to control a control valve 24 and a timing valve 25 which are provided in the lockup control circuit 22 for the purpose of adjusting the engaging force of the clutch 3a.

Here, the discharging of the hydraulic oil at the time of the speed changing via No. 1 oil discharge passage LD1 from a hydraulic clutch to be disengaged takes place at the time of upshifting from the second speed to the third speed, upshifting from the third speed to the fourth speed and downshifting from the third speed to the first speed. At the time of these speed changing, except at the time of downshifting from the third speed to the first speed when the one-way clutch 7 works, the control valve 21 is changed over to the right-hand side position to connect the accumulator A1 to No. 1 oil discharge passage LD1. The accumulated hydraulic oil in the accumulator A1 is thus supplied to No. 1 oil discharge passage LD1 to buffer the decrease or drop in the pressure of the hydraulic clutch to be disengaged. Thereafter, when the hydraulic oil pressure in the hydraulic clutch to be engaged has increased to a predetermined pressure, the control valve 21 is changed over to the left-hand side position through the input of the clutch pressure from No. 13 oil passage L13 to thereby connect No. 1 oil discharge passage LD1 to the oil discharge port 21a. The hydraulic oil from the hydraulic clutch to be disengaged is thus made to be discharged also from the oil discharge port 21a, in addition to an oil discharge port LD1a with an orifice of No. 1 oil discharge passage LD1. The pressure decrease or drop characteristics of the hydraulic clutch to be disengaged is thus made to be accompanied with slowness or rapidity so that an appropriate simultaneous engagement thereof with the hydraulic clutch to be engaged can be obtained.

By the way, the hydraulic oil pressure to a hydraulic clutch to be engaged is adjustable by a pressure adjusting valve 26 which is interposed in No. 3 oil passage L3. There is inputted to this pressure adjusting valve 26, via No. 19 oil passage L19, an output hydraulic oil pressure from a hydraulic oil pressure control valve 27 which is made up of a linear solenoid valve to be controlled by the electronic control circuit 9. The pressure increase characteristics in the hydraulic clutch to be engaged are controlled, at the time of speed changing, by the hydraulic oil pressure control valve 27 via the pressure adjusting valve 26.

There is provided No. 20 oil passage L20 which is connected to No. 13 oil passage L13 via an annular groove 15h of No. 3 shift valve 15 at the right-hand side position thereof. An accumulator A3 for the third speed is thus connected to No. 20 oil passage L20, and an accumulator A4 for the fourth speed is connected to No. 11 oil passage L11. It is thus so arranged that the pressure increase or boosting in the third-speed hydraulic clutch C3 at the time of upshifting to the third speed and the pressure decrease in the third-speed hydraulic clutch C3 at the time of downshifting from the third speed to the second speed can be buffered by the accumulator A3 and that the pressure increase in the fourth-speed hydraulic clutch C4 at the time of upshifting to the fourth speed and the pressure decrease in the fourth-speed hydraulic clutch C4 at the time of downshifting from the fourth speed can be buffered by the accumulator A4. To back pressure chambers of these accumulators A3, A4 there is connected No. 21 oil passage L21 which is branched from No, 1 oil passage L1. In this No. 21 oil passage L21 there is disposed a control valve 28 which can be changed over between the right-hand side position in which this No. 21 oil passage L21 is brought into a communicated state and the left-hand side position in which the communicated state is cut off. The control valve 28 is urged to the left by the modulator pressure to be inputted via No. 4 oil passage L4 and to the right by the output oil pressure of the hydraulic oil pressure control valve 27, to be inputted via No. 19 oil passage L19. At the time of downshifting from the fourth speed to the third speed or at the time of downshifting from the third speed to the second speed by depressing the accelerator pedal, the output hydraulic oil pressure of the hydraulic oil pressure control valve 27 is increased or boosted depending on the throttle opening degree to change over the control valve 28 to the right-hand side position. The line pressure is thus inputted to the back pressure chambers of the accumulators A3, A4 via No. 21 oil passage L21. In addition, a combined oil discharge passage LD which is made up by combining, via a shuttle valve 29, No. 3 oil discharge passage LD3 to be connected to the fourth-speed hydraulic clutch C4 at the time of downshifting from the fourth speed and No. 2 oil discharge passage LD2 to be connected to the third-speed hydraulic clutch C3 at the time of downshifting from the third speed to the second speed, is arranged to be brought into communication with an oil discharge port 28a of the control valve 28 at the right-hand side position thereof. According to this arrangement, at the time of downshifting by depressing the accelerator pedal, the hydraulic clutch to be disengaged is rapidly disengaged, with the result that the engine races to an appropriate degree to thereby effect a smooth speed changing. At this time, the line pressure is inputted from No. 21 oil passage L21 to the pressure adjusting valve 26, and the oil supply pressure to the hydraulic clutch to be engaged also increases.

In order to decrease or alleviate the in-gear shocks, i.e., shocks at the time of gear engagement, when the gear is engaged to start the vehicle by changing over the manual valve 12 from the "P" or "N" position to the "D" position, a squat control is made in which the second-speed transmission train G2 is established first by changing over No. 1 shift valve 13 to the left-hand side position and No. 2 shift valve 14 to the right-hand side position and then the first-speed transmission train G1 is established by changing over No. 1 shift valve 13 to the right-hand side position. At this time, it is necessary to prevent the hydraulic oil pressure in the first-speed hydraulic clutch C1 from rising earlier than the hydraulic oil pressure in the second-speed hydraulic clutch C2. For that purpose, No. 2 oil passage L2 is provided with a small-diameter orifice 30 which is located on a downstream side of the branched portion of No. 3 oil passage L3. Furthermore, No. 2 oil passage L2 is provided with a pair of bypass passages L2a, L2b which bypass the orifice 30. There is interposed in one of them, i.e., in No. 1 bypass passage L2a, a check valve 31 which allows for the oil supply from the upstream side to the downstream side and, in the other of them, i.e., in No. 2 oil passage L2b, a check valve 32 which allows for the oil supply from the downstream side to the upstream side. Further, by the changing over of No. 1 shift valve 13 both bypass passages L2a, L2b are arranged to be selectively communicated via an annular groove 13e of No. 1 shift valve 13. Until No. 1 shift valve 13 is changed over, by the squat control, from the left-hand side position to the right-hand side position to thereby shift down from the second speed to the first speed, the hydraulic oil is slowly supplied to No. 1 hydraulic clutch C1 only via the orifice 30. When the downshifting has been effected, No. 1 bypass passage L2a is opened to communication and, by the hydraulic oil supply via the bypass passage L2a, No. 1 hydraulic clutch C1 is arranged to quickly rise in the hydraulic oil pressure.

Further, in the "D" position of the manual valve 12, the line pressure is inputted to a right side oil chamber 16a of a servo valve 16 via No. 22 oil passage L22 which is connected to No. 1 oil passage L1 via an annular groove 12a of the manual valve 12, a servo control valve 33, and No. 23 oil passage L23. The servo valve 16 is thus moved to the left to change over the selector gear 6 to the left forward-running position. Further, No. 23 oil passage L23 is connected to the back pressure chamber of the accumulator A1 for the first speed so as to control the back pressure of the accumulator A1 by means of the servo control valve 33. Here, the servo control valve 33 is so arranged as to be urged to the left-hand side position in which No. 22 oil passage L22 and No. 23 oil passage L23 are brought into communication with each other by that hydraulic oil pressure (first-speed oil pressure) of the first-speed hydraulic clutch C1 which is inputted via a branch oil passage L2c of No. 2 oil passage L2. Thus, until the first-speed oil pressure increases to a predetermined pressure, the servo control valve 33 is held to the right-hand side position, and No. 23 oil passage L23 is connected to an oil discharge port 33a of the servo control valve 33. In this manner, the back pressure of the accumulator A1 is held to a low pressure at the beginning of the in-gear time, i.e., at the beginning of the gear engagement, so that the boosting in the first-speed oil pressure is buffered in a relatively low region of the hydraulic oil pressure. Therefore, even if squat control is not made at the time of gear engagement, the first-speed hydraulic clutch C1 begins to be engaged gradually at a low pressure, thereby alleviating or decreasing the in-gear shocks. Thereafter, by the changeover of the servo control valve 33 to the left-hand side position as a result of increase in the first-speed oil pressure, the back pressure in the accumulator A1 increases and the first-speed oil pressure rises, thereby quickly and completely engaging the first-speed hydraulic clutch C1.

By the way, in this embodying example, the line pressure to be generated in the regulator valve 17 is used as the hydraulic oil pressure for the back pressure in the accumulator A1. However, it may also be so arranged that the output hydraulic oil pressure from the pressure adjusting valve 26 or the hydraulic oil pressure control valve 27 is supplied to No. 22 oil passage L22 so that the back pressure can vary with the engine load.

The above-described No. 2 bypass passage L2b functions to control the pressure decrease characteristics of the first-speed hydraulic clutch C1 at the time of changing over from the "D" position to the "N" position. Its details are explained hereinafter.

Explanations have so far been made about the arrangement of the hydraulic oil circuit in the "D" position of the manual valve 12. Similar arrangement in the hydraulic oil circuit as in the "D" position also applies to the "S" position, in which automatic speed changing between the first speed through the fourth speed is effected according to speed change characteristics that are different from those in the "D" position.

In the "2" position of the manual valve 12, No. 1 oil passage L1 is connected to No. 2 oil passage L2 via the annular groove 12a of the manual valve 12 and is also connected, via the annular grooves 12a, a connection passage 12d and an annular groove 12e, to No. 9 oil passage L9. The line pressure is thus inputted to No. 1 shift valve 13 via No. 9 oil passage L9 and also the output hydraulic oil pressure of the pressure adjusting valve 26 is inputted to No. 1 shift valve 13 via No. 3 oil passage L3. To No. 8 oil passage L8 which leads to No. 2 shift valve 14 there are connected No. 9 oil passage L9 in the right-hand side position of No. 1 shift valve 13 via the annular groove 13d of No. 1 shift valve 13, as well as No. 3 oil passage L3 in the left-hand side position thereof. When No. 8 oil passage L8 is connected to No. 7 oil passage L7 via the annular groove 14c of No. 2 shift valve 14 by changing over No. 2 shift valve 14 to the right-hand side position, the hydraulic oil is supplied to the second-speed hydraulic clutch C2 in whichever, i.e., right or left, position No. 1 shift valve 13 may be positioned, thereby establishing the second-speed transmission train G2. By the way, if the manual shift valve 12 is changed over to the "2" position to thereby suddenly downshift to the second speed while running at a high speed, there sometimes occurs overrunning of the engine or large speed change shocks. Therefore, the following procedure is followed. Namely, when speed changing has been made to the "2" position at above a predetermined vehicle speed, No. 2 shift valve 14 is changed over to the left-hand side position to connect No. 8 oil passage L8 to No. 13 oil passage L13 via the annular groove 14d of No. 2 shift valve 14. The hydraulic oil is thus supplied to the third-speed hydraulic clutch C3 via No. 3 shift valve 15 to thereby establish the third-speed transmission train G3. When the vehicle speed has once been reduced below a predetermined speed, No. 2 shift valve 14 is changed over to the right-hand side position to thereby downshift to the second speed. No. 3 shift valve 15 is provided with a left end oil chamber 15i to which is connected No. 24 oil passage L24 which extends from the servo control valve 33. No. 9 oil passage L9 is connected to No. 24 oil passage L24 via a shuttle valve 34. In the "2" position of the manual valve 12 the line pressure is inputted to the oil chamber 15i from No. 9 oil passage L9 via No. 24 oil passage L24. No. 3 shift valve 15 is restrained to the right-hand third-speed position in which No. 10 oil passage L10 which is communicated with the third-speed hydraulic clutch C3 is connected to No. 13 oil passage L13 via the annular groove 15c of No. 3 shift valve 15. Even if No. 1 solenoid valve $20_1$ is closed, No. 3 shift valve 15 will not be changed over to the left-hand fourth-speed position.

In the "L" position of the manual valve 12, No. 1 oil passage L1 is connected to No. 2 oil passage 12 via the annular groove 12a of the manual valve 12 and also connected to No. 25 oil passage L25 which is communicated with a left end oil chamber 14f of No. 2 shift valve 14 via the annular groove 12a, the connecting passage 12d and the annular groove 12e. No. 2 shift valve 14 is thus restrained to the right-hand second-speed position. Further, No. 26 oil passage L26 which extends from No. 1 shift valve 13 is connected to No. 3 oil passage L3 via an annular groove 12c of the manual valve 12. When No. 1 shift valve 13 is changed over to the right-hand side position, No. 26 oil passage L26 is connected, via the annular groove 13f of No. 1 shift valve 13, to No. 27 oil passage L27 which leads to the first-speed holding hydraulic clutch CH. The hydraulic oil is thus supplied to the first-speed holding clutch CH, thereby establishing the first-speed transmission train G1 in a condition in which the engine braking can be applied. When a changeover is made to the "L" position at above a predetermined vehicle speed, No. 1 shift valve 13 is changed over to the left-hand side position to connect No. 3 oil passage L3 to No. 8 oil passage L8. The hydraulic oil is thus supplied to the second-speed hydraulic clutch C2 via No. 2 shift valve 14 that is restrained to the right second-speed position, thereby establishing the second-speed transmission train G2. When the vehicle speed has been decreased below a predetermined speed, No. 1 shift valve 13 is changed over to the right-hand side position to thereby downshift to the first speed.

In No. 27 oil passage L27 there is disposed a control valve 35 which can be changed over between the right-hand side position in which No. 27 oil passage L27 is brought into a communicated state and the left-hand side position in which this communicated state is cut off. Until the servo control valve 33 is changed over to the left-hand side position at the time of changing over from the "R" position to the "L" position, the control valve 35 is changed over to the left-hand side position by the line pressure to be inputted via No. 24 oil passage L24. The oil supply to the first-speed holding clutch CH is thus blocked, and the interlocking between the reverse transmission train GR and the first-speed transmission train G1 is blocked.

In the "R" position of the manual valve 12, No. 1 oil passage L1 is connected, via the annular groove 12a of the manual valve 12, to No. 28 oil passage L28 which leads to No. 1 shift valve 13. By the changing over of No. 1 shift valve 13 to the left-hand side position, No. 28 oil passage L28 is connected, via an annular groove 13g of No. 1 shift valve 13, to No. 29 oil passage L29 which leads to the left end oil chamber 16b of the servo valve 16. Therefore, by the line pressure to be inputted via No. 29 oil passage L29, the servo valve 16 is moved to the right, thereby changing over the selector gear 6 to the right reverse-running position. In this reverse-running position, No. 29 oil passage L29 is connected to No. 30 oil passage L30 which leads to the manual valve 12 via that axial bore 16c in the servo valve 16 which opens into the above-described oil chamber 16b. In the "R" position of the manual valve 12, No. 30 oil passage L30 is connected to No. 11 oil passage L11 which is in communication with the fourth-speed hydraulic clutch C4 via the annular groove 12c, a connection passage 12g and an annular groove 12h of the manual valve 12. The reverse transmission train GR is thus established by the changing over of the selector gear 6 to the reverse-running position and the hydraulic oil supply to the fourth-speed hydraulic clutch C4.

When the manual valve 12 is changed over from the "R" position to the forward-running position of "D", "S", "2" or "L", the line pressure is inputted to the right-hand oil chamber 16a of the servo valve 16, as described above. The servo valve 16 is thus moved to the left to change over the selector gear 6 to the left forward-running position. In this case, if the selector gear 6 is moved to the left while the output shaft 1b is rotating by inertia to the opposite direction due, for example, to racing of the driving wheels, the changing over to the forward-running position will not be made smoothly. As a solution, there is provided the servo control valve 33 that moves in response to the hydraulic oil pressure of the first-speed hydraulic clutch C1. When the hydraulic oil pressure in the first-speed hydraulic clutch C1 has increased to a certain degree and, due to the engaging force of the first-speed hydraulic clutch C1, the reverse running of the output shaft 1b has been braked, the servo control valve 33 is moved to the left. As a result, the line pressure is inputted from No. 22 oil passage L22 to the oil chamber 16a via No. 23 oil passage L23. Further, the hydraulic oil pressure of No. 29 oil passage L29 is caused to be applied to the left end of the servo control valve 33 so that, at the time of reverse running, the servo control valve 33 can surely be returned to the right-hand side position.

Furthermore, there is provided No. 31 oil passage L31 which is communicated, at the reverse-running position of the servo valve 16, with the right-hand side oil chamber 16a of the servo valve 16 via a notched groove 16d thereof. No. 24 oil passage L24 which is communicated with the left end oil chamber 15i of No. 3 shift valve 15 is arranged to be changed over in its connection, in the right-hand side position of the servo control valve 33, to No. 22 oil passage L22 and, in the left-hand side position of the servo control valve 33, to No. 31 oil passage L31. According to this arrangement, in case the selector gear 6 is not changed over to the forward-running position when a changeover has been made from the "R" position to the "D" or "S" position because the servo control valve 33 is restrained to the right-hand side position, or else, even when the servo control valve 33 has been changed over to the left-hand side position, because the servo valve 16 is restrained to the reverse-running position, the line pressure is inputted to the left end oil chamber 15i of No. 3 shift valve 15 from No. 22 oil passage L22 or No. 31 oil passage L31 via No. 24 oil passage L24. Therefore, No. 3 shift valve 15 is restrained to the right-hand third-speed position, and it becomes impossible to supply the hydraulic oil to the fourth-speed hydraulic clutch C4. The establishment of the reverse-running transmission train GR at the "D" or "S" position is thus blocked. Further, the control valve 35 is changed over to the left-hand side position by the input of the line pressure via No. 24 oil passage L24, and No. 2 oil discharge passage LD3 to be connected to the fourth-speed hydraulic clutch C4 is connected to the oil discharge port 35a of the control valve 35, thereby quickly disengaging the fourth-speed hydraulic clutch C4.

In the "N" position of the manual valve 12, the communication between No. 1 oil passage L1 and the other oil passages is cut off. By the way, when the vehicle is stopped in a condition in which the manual valve 12 is in the "D" position, the driving unit made up of the engine and the transmission displaces in posture while elastically deforming engine mounting elements by the driving reaction forces due to the power transmission via the first-speed transmission train G1. When the manual valve 12 is changed over at this time to the "N" position to attain the neutral condition, the displaced driving unit returns to the normal position, giving rise to a problem of shocks (off-gear shocks or shocks at the time of gear disengagement). In the "N" position, No. 2 oil passage L2 is opened to atmosphere via the manual valve 12, and the hydraulic oil is discharged from the first-speed hydraulic clutch C1. At this time, if the hydraulic oil pressure in the first-speed hydraulic clutch C1 is gradually decreased by restricting the oil discharge by means of the orifice 30 in No. 2 oil passage L2, the above-described off-gear shocks by a rapid releasing of the driving force can be prevented. However, in case the viscosity of the hydraulic oil is high at a low temperature, the releasing of the first-speed hydraulic clutch C1 will become too slow if the oil discharge is restricted by the orifice 30. As a result, it will cause the dragging of the hydraulic clutch C1 and badly affects the durability of the hydraulic clutch C1. In this case, if No. 1 shift valve 13 is changed over to the left-hand side position, the above-described second bypass passage L2b is opened to communication to discharge the hydraulic oil by bypassing the orifice 30. Therefore, there will occur no such disadvantage as an excessive delay in the disengagement of the first-speed hydraulic clutch C1.

In the "N" position, the electric power supply to the splenoid valves is normally cut off to save the electric power consumption. In such a case, No. 1 shift valve 13 may be changed over to the left-hand side position by the closing operation of the normally-closed type No. 1 and No. 2 solenoid valves $20_1$, $20_2$. When the off-gear shocks become the problem, however, No. 1 shift valve 13 is held to the right-hand side position for a predetermined period of time from the time of changeover from the "D" position to the "N" position to shut off the second bypass passage L2b of No. 2 oil passage L2, thereby restricting the oil discharge through the orifice 30.

In the "P" position of the manual valve 12, No. 1 oil passage L1 is connected, like in the "R" position, to No. 28 oil passage L28 and changes over the servo valve 16 to the reverse-running position by the inputting of the line pressure thereto via No. 29 oil passage L29. However, since No. 30 oil passage L30 is not connected to No. 11 oil passage L11 in the "P" position, the reverse transmission train GR is not established.

As can be seen from the above description, according to the present invention, the hydraulic engaging element for the low-speed transmission train can, at first, be gradually engaged at the time of gear engagement and thereafter be rapidly brought into complete engagement. In-gear shocks can therefore be alleviated without impairing the start-response characteristics.

It is readily apparent that the above-described control apparatus for a hydraulically operated vehicular transmission meets all of the objects mentioned above and also has the advantage of wide commercial utility. It should be understood that the specific form of the invention herein above described is intended to be representative only, as certain modifications within the scope of these teachings will be apparent to those skilled in the art.

Accordingly, reference should be made to the following claims in determining the full scope of the invention.

What is claimed is:

1. A control apparatus for a hydraulically operated vehicular transmission having a plurality of hydraulic engaging elements, said apparatus having an accumulator which is connected in parallel with a hydraulic engaging element for a low-speed transmission train and a back pressure generating source which generates a hydraulic oil pressure to be supplied to a back pressure chamber of said accumulator, said control apparatus comprising:

a changeover valve which can be changed over between a first position in which the back pressure chamber of said accumulator and said back pressure generating source are brought into communication with each other and a second position in which the communication is cut off to lower a pressure in the back pressure chamber, said changeover valve being arranged to be changed over from the second position to the first position when a hydraulic oil pressure in the hydraulic engaging element for the low-speed transmission train has exceeded a predetermined pressure.

2. A control apparatus according to claim 1, further comprising a servo valve for changing over between forward running and reverse running, and an oil passage to which a hydraulic oil pressure is supplied via said changeover valve at the first position thereof such that said servo valve can be changed over to a forward running position by the hydraulic oil pressure in said oil passage.

3. A control apparatus according to claim 2, wherein the hydraulic oil pressure in said oil passage is the hydraulic oil pressure of said back pressure generating source.

4. A control apparatus according to any one of claims 1 through 3, wherein said back pressure chamber of said accumulator is drained at the second position of said changeover valve.

5. A control apparatus according to any one of claims 1 through 3, wherein said back pressure generating source is a regulator valve.

6. A control apparatus according to any one of claims 1 through 3, wherein said back pressure generating source is arranged to generate a hydraulic oil pressure corresponding to an engine load.

* * * * *

UNITED STATES PATENT AND TRADEMARK OFFICE
CERTIFICATE OF CORRECTION

PATENT NO. : 5,565,001
DATED : October 15, 1996
INVENTOR(S) : SAKAI et al

It is certified that error appears in the above-indentified patent and that said Letters Patent is hereby corrected as shown below:

Title Page, item [73], the Assignee's name is incorrect, delete "Honda Giken Kabushiki Kaisha" and add therefor, --Honda Giken <u>Kogyo</u> Kabushiki Kaisha--

Signed and Sealed this

Sixth Day of May, 1997

*Attest:*

BRUCE LEHMAN

*Attesting Officer*   Commissioner of Patents and Trademarks